United States Patent
McClimans et al.

(10) Patent No.: US 10,717,169 B2
(45) Date of Patent: Jul. 21, 2020

(54) LENS HOLDER AND METHOD OF USE

(71) Applicant: ESSILOR INTERNATIONAL (COMPAGNIE GENERALE D'OPTIQUE), Charenton-le-Pont (FR)

(72) Inventors: Pamela Anne McClimans, Dallas, TX (US); John Guerra, Dallas, TX (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 6 days.

(21) Appl. No.: 15/540,234

(22) PCT Filed: Nov. 6, 2015

(86) PCT No.: PCT/EP2015/075904
§ 371 (c)(1),
(2) Date: Jun. 27, 2017

(87) PCT Pub. No.: WO2016/107690
PCT Pub. Date: Jul. 7, 2016

(65) Prior Publication Data
US 2017/0361415 A1    Dec. 21, 2017

Related U.S. Application Data

(60) Provisional application No. 62/099,001, filed on Dec. 31, 2014.

(51) Int. Cl.
*B24B 13/005* (2006.01)
*B29D 11/00* (2006.01)
*G02C 7/02* (2006.01)

(52) U.S. Cl.
CPC .... *B24B 13/0055* (2013.01); *B29D 11/00317* (2013.01); *G02C 7/021* (2013.01)

(58) Field of Classification Search
CPC ................ B24B 13/0055; B29D 11/00317
See application file for complete search history.

(56) References Cited

U.S. PATENT DOCUMENTS 3,381,356 A * 5/1968 Santinelli .............. B24B 13/005
164/112
3,962,833 A * 6/1976 Johnson ................ B24B 13/005
451/42

(Continued)

FOREIGN PATENT DOCUMENTS

DE          10310561       10/2004
WO     WO 2013/088021  *  6/2013

OTHER PUBLICATIONS

Office Action issued in Corresponding Chinese Patent Application No. 201580071575.5, dated Oct. 26, 2018.

*Primary Examiner* — Elizabeth A Burkhart
(74) *Attorney, Agent, or Firm* — Norton Rose Fulbright US LLP

(57) ABSTRACT

A lens holder assembly (49) and method of using the lens holder assembly (49) to mark an ophthalmic lens (3) is provided. The lens holder assembly (49) comprises a stem (61) having a central axis and a first opening (5) extending along the central axis of the body (65), a second opening (7) integrated within the stem (61) such that the second opening (7) is substantially parallel to the first opening (5), and at least one illumination source positioned within the second opening (7). The illumination source is capable of emitting light through the second opening (7) for illuminating at least a portion of an ophthalmic lens (3). At least a portion of the lens (3) is placed over the first opening (5). Suction is applied to the lens (3), and a marking is applied to a surface of the lens (3).

11 Claims, 8 Drawing Sheets

(56) References Cited

U.S. PATENT DOCUMENTS

| | | |
|---|---|---|
| 4,184,292 A | 1/1980 | DeFazio et al. |
| 2006/0073771 A1 | 4/2006 | Mandler et al. |
| 2009/0029061 A1* | 1/2009 | Shinde ................ B05B 13/0228 427/508 |
| 2015/0002656 A1* | 1/2015 | Dubois .............. G01M 11/0207 348/95 |

* cited by examiner

LENS HOLDER AND METHOD OF USE

CROSS-REFERENCE TO RELATED APPLICATIONS

This application is a national phase application under 35 U.S.C. § 371 of International Application No. PCT/EP2015/075904 filed 6 Nov. 2015, which claims priority to U.S. Provisional Application No. 62/099,001 filed 31 Dec. 2014. The entire contents of each of the above-referenced disclosures is specifically incorporated by reference herein without disclaimer.

TECHNICAL FIELD

The present invention relates to a lens holder and a method of using a lens holder to mark an ophthalmic lens.

BACKGROUND

Pad printing is a method of marking ophthalmic lenses. This method can involve subjecting the face of a lens to be marked to a corona discharge, a flame, or ionized air in order to increase the surface energy and thereby improve adherence of the surface to be marked. The lens can then be marked with a marking using pad transfer or silk screening printing with a special marking ink. The ink is then dried. Thereafter, the ink component can be removed with an appropriate solvent, if desired.

Pad printing methods can present difficulties to consistently and accurately position a lens with respect to a frame when placing a marking, such as a stamp or engraving, in a desired location on a lens, particularly a tinted or polarized lens.

SUMMARY

Described herein is a lens holder assembly for use with a lens marking apparatus comprising a stem having a central axis and a first opening extending along the central axis of the body, a second opening integrated within the stem such that the second opening is substantially parallel to the first opening, and at least one illumination source positioned within the second opening, wherein the illumination source is capable of emitting light through the second opening for illuminating at least a portion of an ophthalmic lens.

Also presented herein is a method of marking an ophthalmic lens comprising: providing a lens holder assembly, wherein the assembly comprises a stem having a central axis and a first opening extending along the central axis of the body, a second opening integrated within the stem such that the second opening is substantially parallel to the first opening, and at least one illumination source positioned within the second opening, wherein the illumination source is capable of emitting light through the second opening for illuminating at least a portion of an ophthalmic lens; placing at least a portion of the lens over the first opening; applying suction to the lens; and applying a marking to the lens.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION

Figure 1:
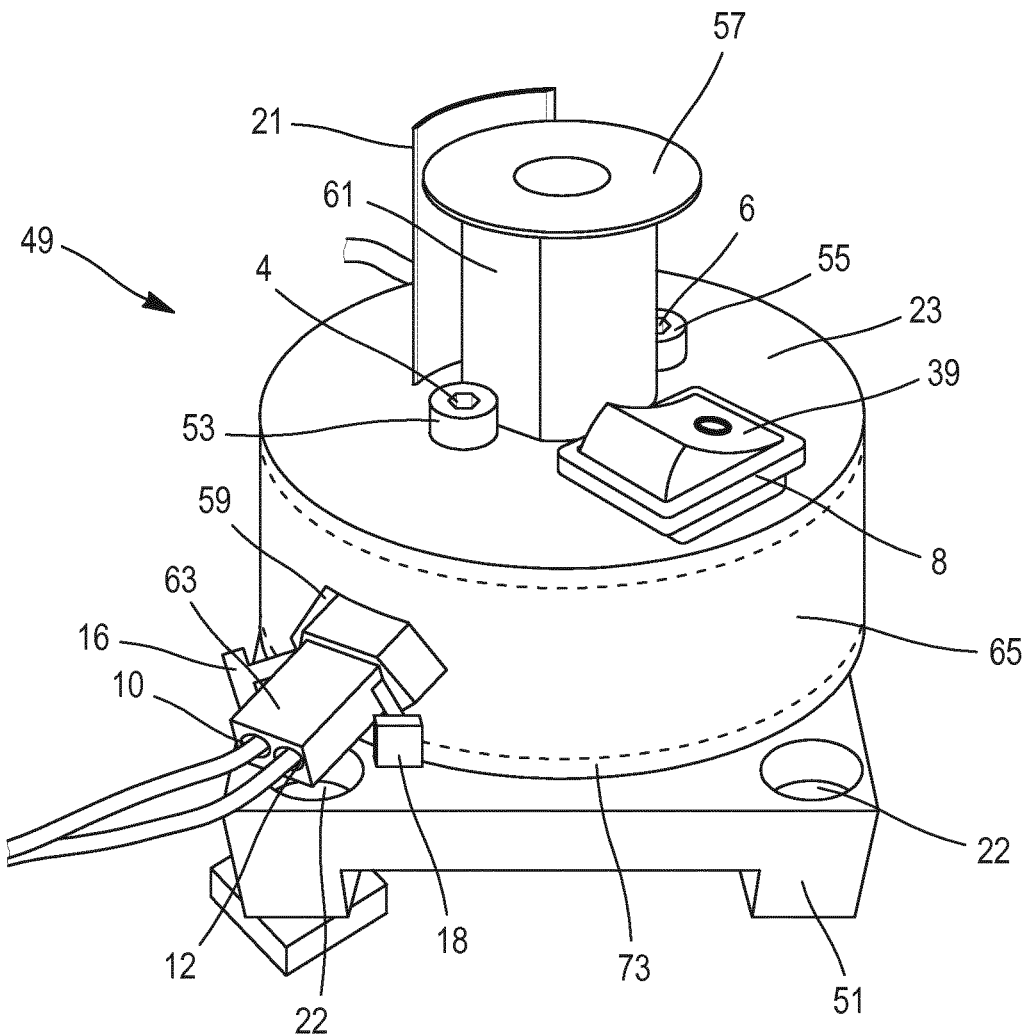
FIG. 1 illustrates a front perspective view of a lens holder assembly.

What is presented herein is a lens holder device and method of using the lens holder to mark an ophthalmic lens. This improved device and method allows a user to consistently orient and position a lens on a lens holder to achieve a marking in a desired location while reducing user error and the chance of mis-marking or damaging the lens, thereby saving time and decreasing manufacturing costs.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b"

represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Herein, the term "lens" means an organic or inorganic glass or polymer lens, preferably an organic lens, comprising a lens substrate which may be coated with one or more coatings of various natures. As used herein, "lens blank" means a transparent medium of a known base curve, with no power, used by optical laboratories, to generate a finished spectacle lens with prescribed powers; it is used for single vision, bi- and tri-focals, and progressive additional lenses (PALs).

Figure 9:
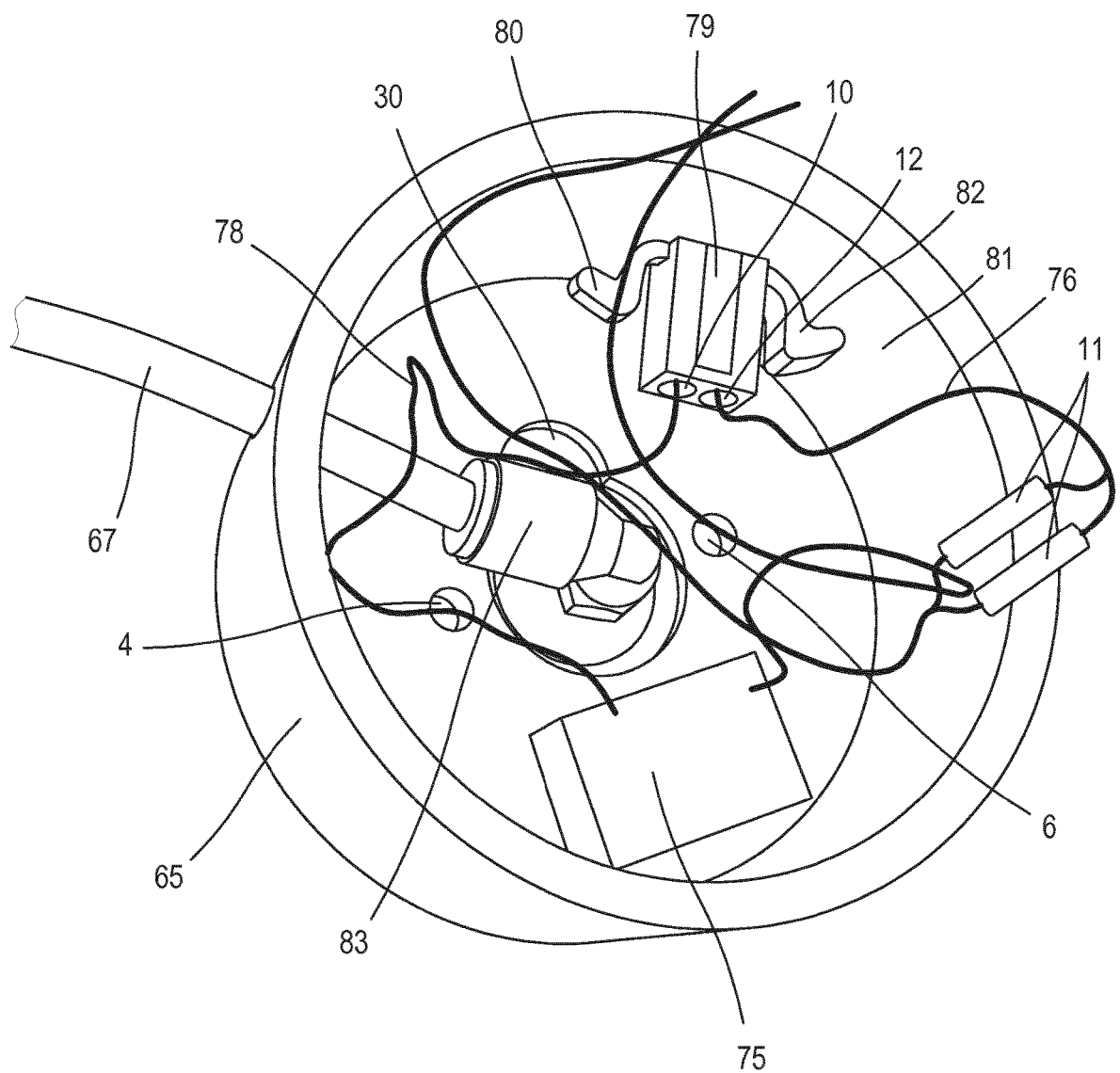
FIG. 9 illustrates a perspective view of the interior cavity of the lens holder assembly body.

Referring now to the figures and more particularly to FIG. 1, an embodiment of a lens holder assembly 49 is illustrated. The lens holder assembly 49 comprises a body 65 defined by a wall. In this embodiment, the body 65 is cylindrical, but other configurations can be contemplated. In an assembled state the wall of the cylindrical body 65 is bound by a top plate 23 and a bottom plate 73 to define a central chamber or cavity 81 that is adapted to house a plurality of components (FIG. 9). The body 65 and plates 23, 73 can be comprised of plastic, nylon, aluminum, or other materials.

The lens holder assembly 49 can be positioned upon and coupled to a base 51. The base 51 can be made of any suitable material, such, as, for example, plastic, metal, or ceramic. The base 51 can be secured to a system platform that is capable of moving in an X, Y, or Z direction. The platform can rotate in any desired direction to enable a user to mark the ophthalmic lenses with a desired marking in any desired orientation. The base 51 can have at least one securement hole 22. In the illustrated embodiment the lens holder assembly 49 comprises four securement holes 22. Each hole 22 is positioned at a corner of the base 51. The lens holder assembly 49 can be secured to the base 51 using any fastening means known in the art, such as, for example, screws or glue. Each of the securement holes 22 can be configured to receive a screw to secure the base to a stationary or moveable surface that can be a part of or used with a lens marking machine. "Lens marking machine" is used herein to include any machine that can be used to apply a marking to a lens such as, but not limited to, stamping, etching, laser engraving, inking, and the like.

The lens holder assembly 49 further comprises a lens mounting sub-assembly 87 (FIG. 8) that is comprised of three components, namely a stem 61, a back plate 21, and an annular lip member 57 such as a lens receiving means. In the illustrated embodiment stem 61 of the lens mounting assembly 87 can be substantially cylindrical, and at least a portion of the outer surface of the column 61 can be substantially flat. Other configurations of the stem 61 can also be contemplated. Stem 61 can be of any desired height. The dimensions of stem 61 can be configured to accommodate lenses of various shapes and designs. All or part of the lens holder assembly 49 can be comprised of plastic, nylon, or any other suitable materials. A first opening 4 is positioned in the top plate 23 on one side of the stem 61 and a second opening 6 positioned in the top plate 23 on an opposite side of the stem 61 from the first opening 4. The openings 4, 6 are configured to receive fastening or securement means such as screws 53, 55, for example, to secure the top plate 23 in place in the assembled state. One of skill in the art will recognize that openings 4, 6 in plate 23 and mirror openings 40, 60 in plate 73 (FIG. 4) can be positioned in any suitable position in order to facilitate securement of the top and bottom plates 23, 73 to the body 65.

Body 65 of the lens holder assembly 49 also comprises a first opening 59. This opening 59 is capable of receiving a multiple circuit connector 63. The circuit connector 63 is a two-pin connector kit configured for receiving at least one wire. For example, the connector 63 can receive an 18 to 22 gauge wire. The circuit connector 63 comprises a moveable first tab 16 and a moveable second tab 18. The multiple circuit connector 63 can be comprised of a plastic material. In this embodiment the multiple circuit connector 63 can be configured to be received within the first opening 59 such that it forms an interference fit with the opening 59. The multiple circuit connector 63 can comprise at least a first channel 10 and a second channel 12 for housing electrical wiring. The electrical wiring connects a power source to an illumination source that can be positioned within a portion of the stem 61.

An "illumination source" is a light source that is particularly configured to generate radiation having a sufficient intensity to effectively illuminate an interior or exterior-space. The term "light source" should be understood to refer to any one or more of a variety of radiation sources, including, but not limited to, light emitting diode ("LED")-based sources (employing one or more LEDs), fluorescent sources, phosphorescent sources, lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermos-luminescent sources, triboluminescent sources, sonoluminescent sources, radioluminescent sources, and luminescent polymers. A light source may include as an integral component one or more filters (e.g., color filters), lenses, or other optical components. Also, it should be understood that light sources may be configured for a variety of applications, including, but not limited to, indication and/or illumination.

The lens holder assembly 49 further comprises an ON/OFF rocker switch 39 that is coupled to a power source such as a battery or electrical wall outlet to used to selectively provide power to the illumination source from a power source and to turn the illumination source on or off.

Figure 2:
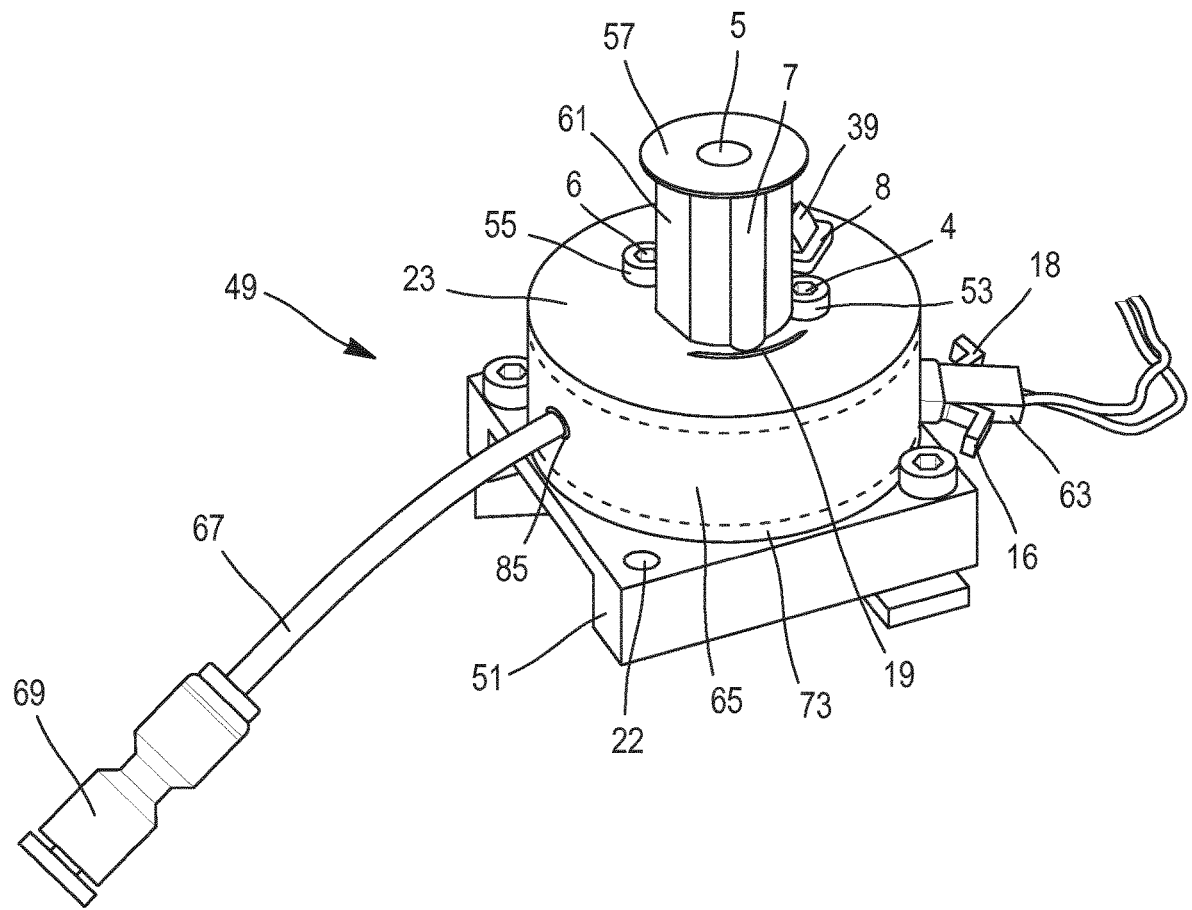
FIG. 2 illustrates a rear perspective view of the lens holder assembly.

Referring to FIG. 2, stem 61 comprises a first opening or channel 5 that extends along a central axis of the stem 61 and a second opening or channel 7 that extends parallel to the first opening 5. Body 65 comprises a second opening 85 that is defined within the body 65 of the lens holder assembly 49 and is configured to receive hose 67. Channel 5 is positioned within the stem 61 and is configured for receiving compressed air from a suction source through hose 67. One end of hose 67 is secured to at least a portion of lens holder assembly 49 within cavity 81 (FIG. 9) by connector 83 and is in secured communication with channel 5. The other end of hose 67 is coupled to a connector 69 that is adapted to be connected to a suction source. An illumination source (not shown) is positioned within at least a portion of channel 7. The illumination source can be, for example, a light emitting diode (LED). In one embodiment the LED can emit non-colored light or white light. In other embodiments, the LED can emit colored light. The term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

In other embodiments, a plurality of illumination sources can be positioned within channel 7. Some examples of LEDs include, but are not limited to, various types of infrared LEDs, ultraviolet LEDs, red LEDs, blue LEDs, green LEDs, yellow LEDs, amber LEDs, orange LEDs, and white LEDs. It also should be appreciated that LEDs may be configured to generate radiation having various bandwidths for a given spectrum (e.g., narrow bandwidth, broad bandwidth).

One implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board. LEDs, T-package mount LEDs, radial package LEDs, power package LEDs, LEDs including some type of encasement and/or optical element (e.g., a diffusing lens), etc.

The LED that can be used with this lens holder assembly 49 described herein can be a solid state semiconductor diode that emits light when an electrical current is applied, in a simple LED circuit. The illumination source or LED can have a first electric-current conducting connection and a second electric-current conducting connection, whereby electric current is conductable to the first electrical conducting connection, through the light-generating component and from the second electrical conducting connection, thereby providing electrical energy to the light-generating component.

The LED is connected to a power supply, as described above. The power supply or source is configured to supply electric-current to the light-generating component when a circuit is closed. The LED is in electrical communication with the ON-OFF switch 39 that can open and close an electrical circuit therebetween. The switch opens (OFF) or closes (ON) the circuit, thereby selectively powering the light-generating component and illuminating the lens stem 61 and at least a portion of the lens.

Light generated by the illumination source can be adjustable. The illumination source may be connected to a controller wherein at least a portion of the power delivered to the controller, as derived from an A.C. dimmer circuit, is regulated at a substantially constant value over a significant range of dimmer operation so as to provide an essentially stable power source for the controller and other circuitry associated with the lighting unit. In one aspect of this embodiment, the controller also may be configured to monitor the adjustable power provided by the dimmer circuit so as to permit adjustment of one or more parameters of the light generated by the illumination source in response to operation of the dimmer.

Several parameters of light generated by the illumination source, other than, or in addition to, intensity or brightness, for example, may be controlled in response to dimmer operation. For example, in various embodiments, an illumination source may be configured such that one or more properties of the generated light such as color (e.g., hue, saturation or brightness), or the correlated color temperature of white light, as well as temporal parameters (e.g., rate of color variation or strobing of one or more colors) are adjustable via dimmer operation.

Figure 3:
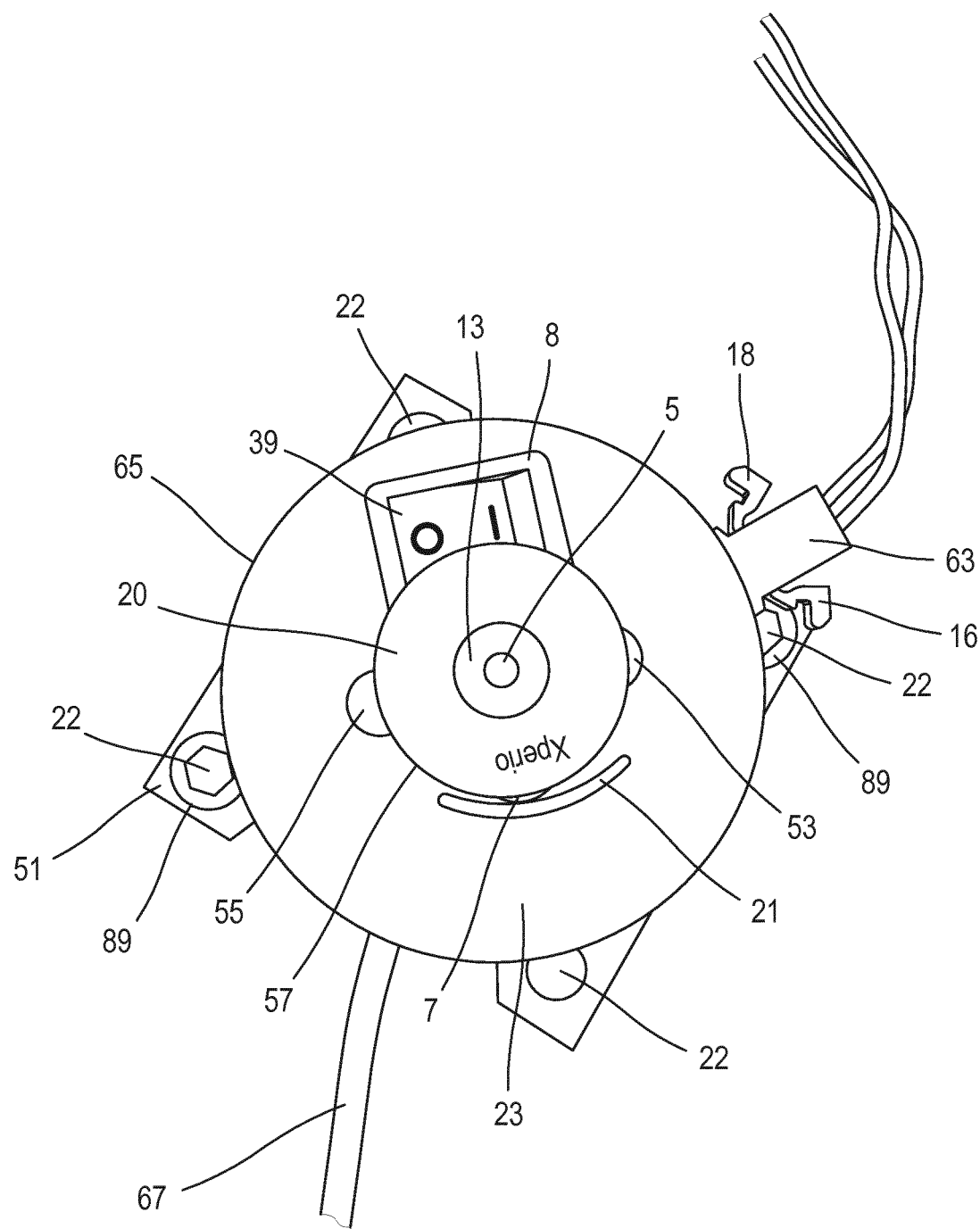
FIG. 3 illustrates a top view of the lens holder assembly.

Referring to FIG. 3, the stem can be positioned substantially within the center of the top plate 23. In other embodiments stem 61 can be positioned anywhere on the surface of the top plate 23. Stem 61 is positioned adjacent to receiving slot 19. Slot 19 is configured to receive at least a portion of back plate 21. In the assembled state back plate 21 is substantially curved with a radius of curvature that is sufficient to surround at least a portion of stem 61.

ON/OFF switch 39 comprises a plastic molded rocker that is horizontally and pivotally mounted in a plastic switch case 8 or housing and operates a conventional movable contact. Upon manual actuation, the switch 39 is moveable between a first position and a second position to turn the illumination source on and off. One side of the plastic rocker is labeled O=off (open circuit), and the opposite end of the plastic rocker is labeled I=on (closed circuit). The housing or switch case 8 can be made of a polyamide material. The switch 39 can be black or any other suitable color. Such switches are commercially available.

Figure 4:
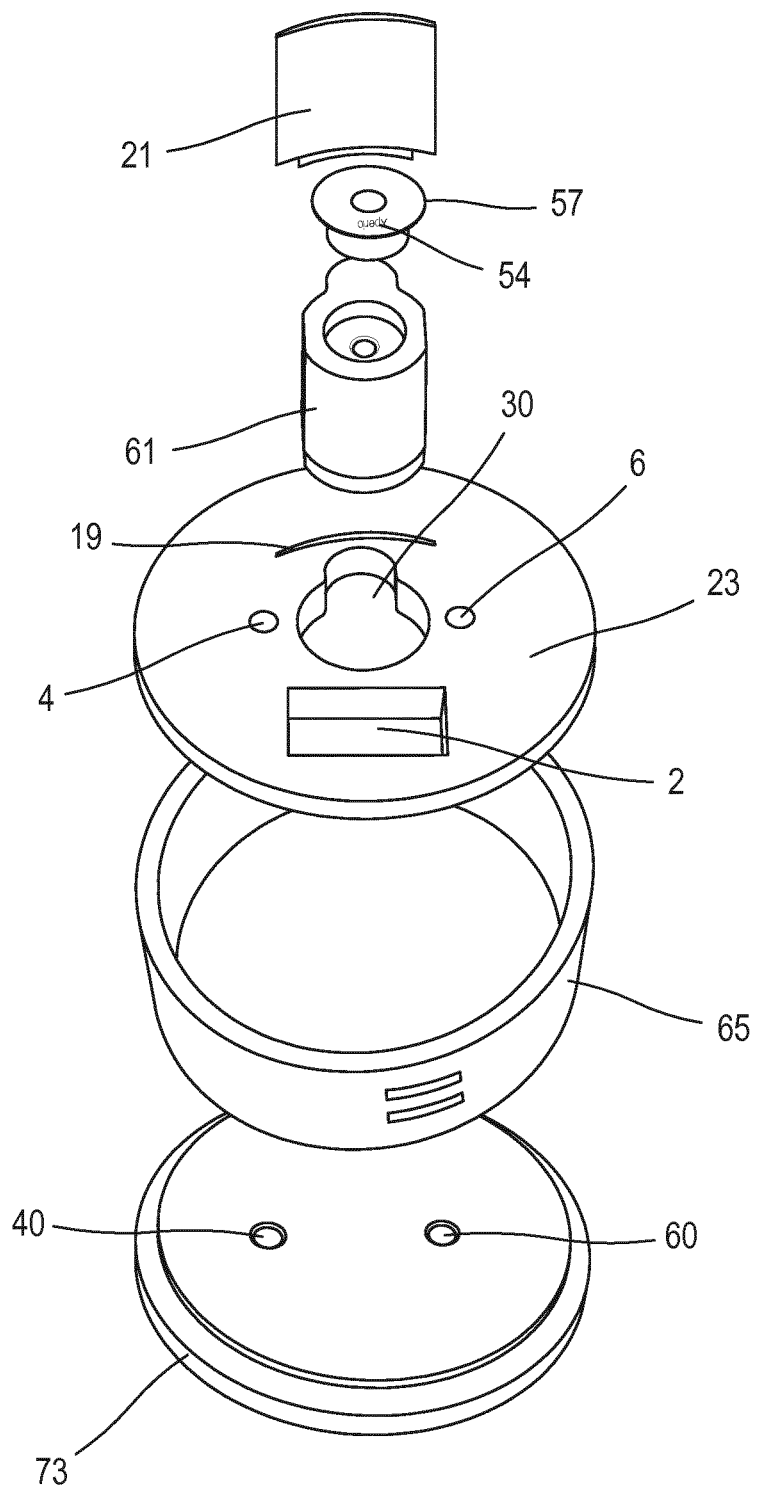
FIG. 4 illustrates an exploded view of a portion of the lens holder assembly.

Referring to FIG. 4, an exploded view of a portion of the lens holder assembly 49 is illustrated. At least a portion of back plate 21 is configured to be received within slot 19 in top plate 23. In the assembled state back plate 21 is positioned in a partially surrounding adjacent relationship to the lens stem 61 and is configured to be removably and separately secured to top plate 23. In other embodiments back plate 21 can be permanently secured to the stem 61. The top and bottom plates 23, 73 can comprise a peripheral lip to engage the top edge of the cylindrical body 65. Stem 61 is configured to be received by opening 30 in top plate 23. Switch 39 is capable of being received by opening 2 in top plate 23.

Figure 5A:
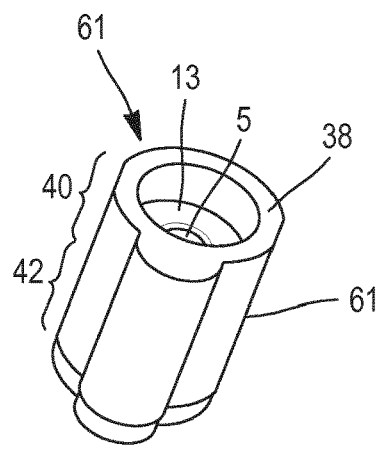
FIG. 5a illustrates a perspective view of the lens holder assembly stem.
Figure 5B:
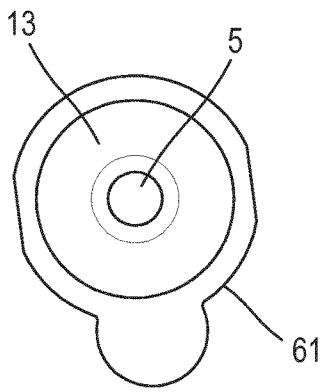
FIG. 5b illustrates a top view of the lens holder assembly stem.
Figure 5C:
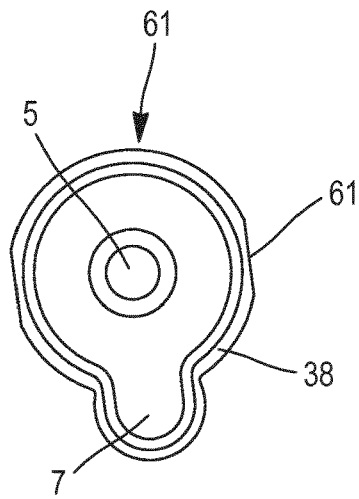
FIG. 5c illustrates a bottom view of the lens holder assembly stem.

Referring to FIGS. 5a, 5b, and 5c, stem 61 of the lens mounting assembly 49 is illustrated. FIG. 5A illustrates a perspective view of stem 61. Stem 61 comprises a body having a wall 38 with a first outer surface portion that defines a first substantially cylindrical structure that substantially surrounds channel 5. The cylindrical structure can have at least one substantially flat side wall portion. In the illustrated embodiment stem 61 can have two substantially flat sidewall portions that can be positioned opposite each other. Stem 61 has a first portion 40 that comprises a recessed chamber 13 that is configured to receive at least a portion of the lens receiving means 57 and a second portion 42 that can be removably coupled to the top plate 23 of the lens holder assembly 49.

The first and second cylindrical portions share wall 38 in the lower second portion 42 of the stem 61, as shown in FIG. 5c. The second substantially cylindrical structure comprise a second outer surface portion and is positioned adjacent and parallel to the first substantially cylindrical portion, surrounding channel 7. Channel 7 extends through the lower second portion 42 of the stem 61, but not through the upper first portion 40. The first and second outer surface portions merge together to form a single continuous smooth, curved, outer unitary surface. Stem 61 can be comprised of any suitable material, such as, but not limited, to nylon or plastic materials. At least a portion of the lens mounting assembly 87 is comprised of at least one transparent or translucent material, such as, for example, a transparent silicone rubber, plastic, or nylon material in order to facilitate the transmission of light from the illumination source through the lens mounting sub-assembly 87 to illuminate at least a portion of an ophthalmic lens. In particular, stem 61 is comprised of a translucent or transparent material that permits light to pass through and is thereby operable to illuminate, for example, a tinted lens. The stem 61 may be formed using any suitable manufacturing process, including molding, machining, and additive manufacturing (3-D printing). The stem 61 may be fabricated from a material that is operable to transmit light, such as a nylon, polyoxymethylene (POM) (i.e., acetal, polyacetal or polyformaldehyde), or similar polymer.

FIG. 5B illustrates a top view of the stem 61. The wall 38 of the stem 61 is of a substantially uniform thickness. In another embodiment, at least a portion of the wall 38 can have a first substantially uniform thickness, and at least a portion of the wall 38 can have a second substantially uniform thickness, where the first and second thicknesses are different. Channel 5 extends from a first end of the first cylindrical structure to a second end of the first cylindrical structure along a central axis and terminates at an annular recessed chamber 13 that is positioned within the first portion 40 of the cylindrical structure. Recessed chamber 13 merges with the second channel 7.

Figure 6A:
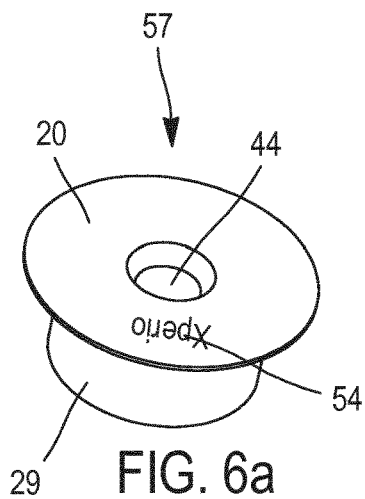
FIG. 6a illustrates a perspective view of the lens receiving means.

FIG. 6A illustrates annular lip member or lens receiving means 57. The lens receiving means 57 comprises a body having a cylindrical base 29 with a cavity 44 and an opening 36 in the center of the cavity 44 of the base 29. The outer diameter of the base 29 is substantially equal to or smaller in diameter than the inner diameter of the recessed chamber 13 of stem 61 such that in the assembled state the lens receiving means 57 forms and interference fit with the cavity 44 of the lens receiving means 57. The opening 36 is positioned substantially within cavity 44 such that in the assembled state it is centered with the opening of channel 5 of the stem 61, thereby extending channel 5.

Figure 6B:
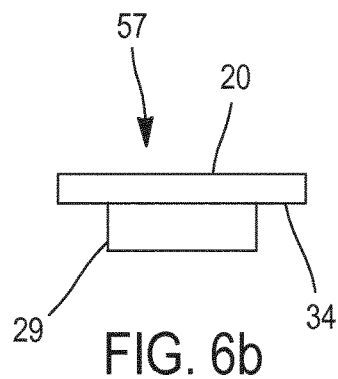
FIG. 6b illustrates is a side view of the lens receiving means.

Referring to FIG. 6B, the base 29 of the lens receiving means 57 is seamlessly connected to a lip 34 that is angled outwardly from the base 29 of the lens receiving means 57. The lip 34 comprises a face 20 that extends circumferentially beyond the outer surface of the first cylindrical portion substantially perpendicularly in relationship to the stem 61. Although the lens receiving means 57 is pictured with a substantially cylindrical base, in one aspect, the base 29 can have any desired shape that is capable of being removably received by the recessed chamber 13 in an interference fit. The face 20 of the lens receiving means 57 is dimensioned such that its diameter has a width that is sufficient to receive at least a portion of a lens 3 before and during a lens marking process. The lens receiving means 57 can be made of rubber or other soft, pliable, non-abrasive, anti-slip materials to allow a lens to be securely positioned on the rubber lens receiving means 57 and to prevent scratches. The lens receiving means 57 can also be comprised of a translucent or transparent material.

Lens receiving means 57 can be removed and exchanged for different sizes and shapes of lens receiving means 57, depending on the type of lens to be used in a lens marking procedure. "Marking" refers herein to the process by which at least one type of marking, particularly, an "optical marking" is applied to a lens or other article. The marking can be applied using stamping, imprinting, engraving, etching, or other means known to those of skill in the art.

Figure 6C:
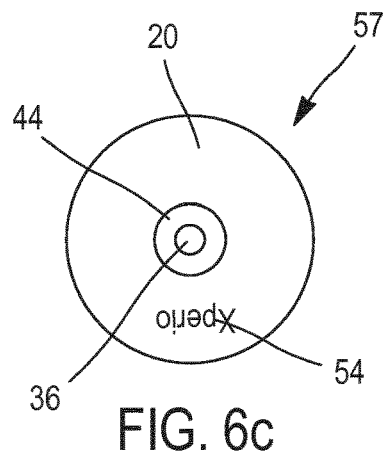
FIG. 6c illustrates a top view of the lens receiving means.

Referring to FIG. 6C the face 20 of the lens receiving means 57 can comprise at least one an optical marking 54 such as letters, numbers, symbols, or other types of markings. For example, as illustrated the optical marking 54 can be imprinted on the face 20 of the lens receiving means 57. The marking 54 can be imprinted on the face 20 of the lens receiving means 57 using permanent ink, temporary ink, or any other marking known to those of skill in the art. Markings such as trademarks, logos, patterns, pictures, or other indicia can be inscribed on the face 20 of the lens receiving means 57, depending on the marking that is to be applied to at least a portion of the lens 3. A plurality of markings 54 can be present on the face 20 of the lens receiving means 57. The marking 54 can be used by a user or a machine as a guide or template to manually or automatically orient at least a portion of the lens 3 on the face 20 of the lens receiving means 57 in relationship to the position of marking 54 on the lens receiving means 57. Thus, the marking 54 can be used as a guide for applying the at least one marking 54 onto at least a portion of lens 3 using a marking machine 45, such as, for example, a stamping machine 45 (FIG. 10).

Figure 7A:
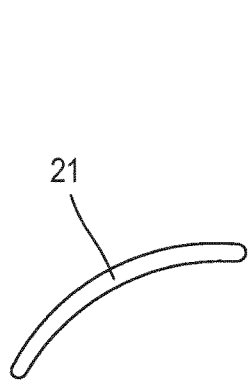
FIG. 7a illustrates a top view of the back plate.
Figure 7B:
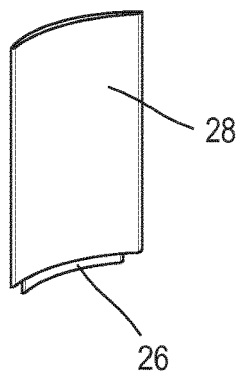
FIG. 7b illustrates a perspective view of the back plate.
Figure 8:
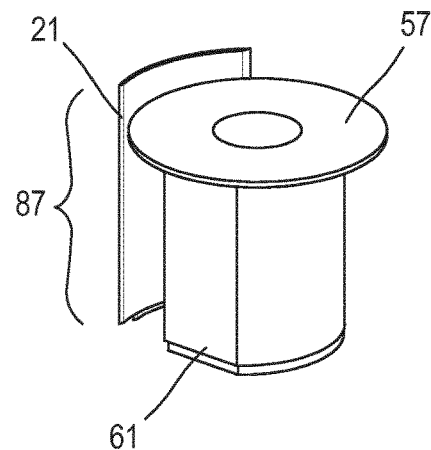
FIG. 8 illustrates a perspective view of the lens mounting sub-assembly.

FIGS. 7A and 7B illustrate a top view and a perspective view of back plate 21. Back plate 21 is comprised of a first portion 26 and a second portion 28. Both the first and second portions 26, 28 of the back plate 21 are substantially curved. The first portion 26 is substantially curved along a first arc with a desired radius of curvature and a first width. The second portion 28 is substantially curved having an arc with a radius that is identical to the first arc and a second width that is smaller than the first width of the first portion 26. Back plate 21 acts as a guide for positioning a lens in relationship to the lens mounting assembly 87. In combination with the negative pressure applied from applying suction to the lens, it can also help to prevent lens 3 from shifting position once it has been positioned on at least a portion of the face 20 of the lens receiving means 57. Although, as illustrated in FIG. 8, back plate 21 surrounds at least a portion of the stem 61, back plate 21 could be configured to be any suitable means for guiding and/or fixing the position of a lens with relationship to the lens mounting assembly 87.

Referring to FIG. 9, cavity 81 of the lens holder assembly 49 is illustrated. Cavity 81 is configured to house several components, such as, but not limited to, electrical wires 76, 78 which connect the power source to the illumination source, resistors 11, and the back 75 of the housing 8 of switch 39. The power source can be a 120 V power source, and the output of the power source can be 6V.

Figure 10:
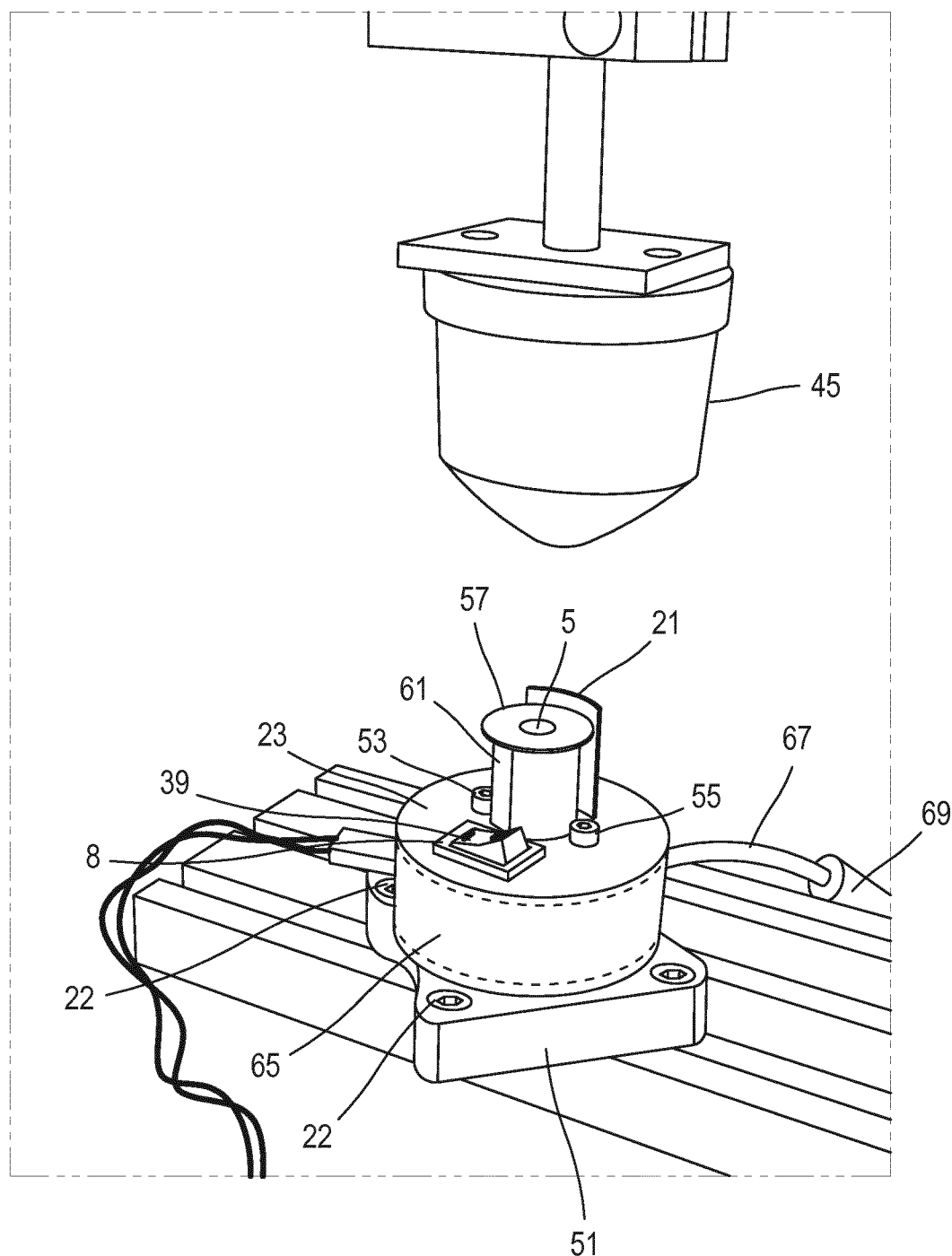
FIG. 10 illustrates a perspective view of the lens holder assembly positioned in relationship to a lens marking machine.
Figure 11:
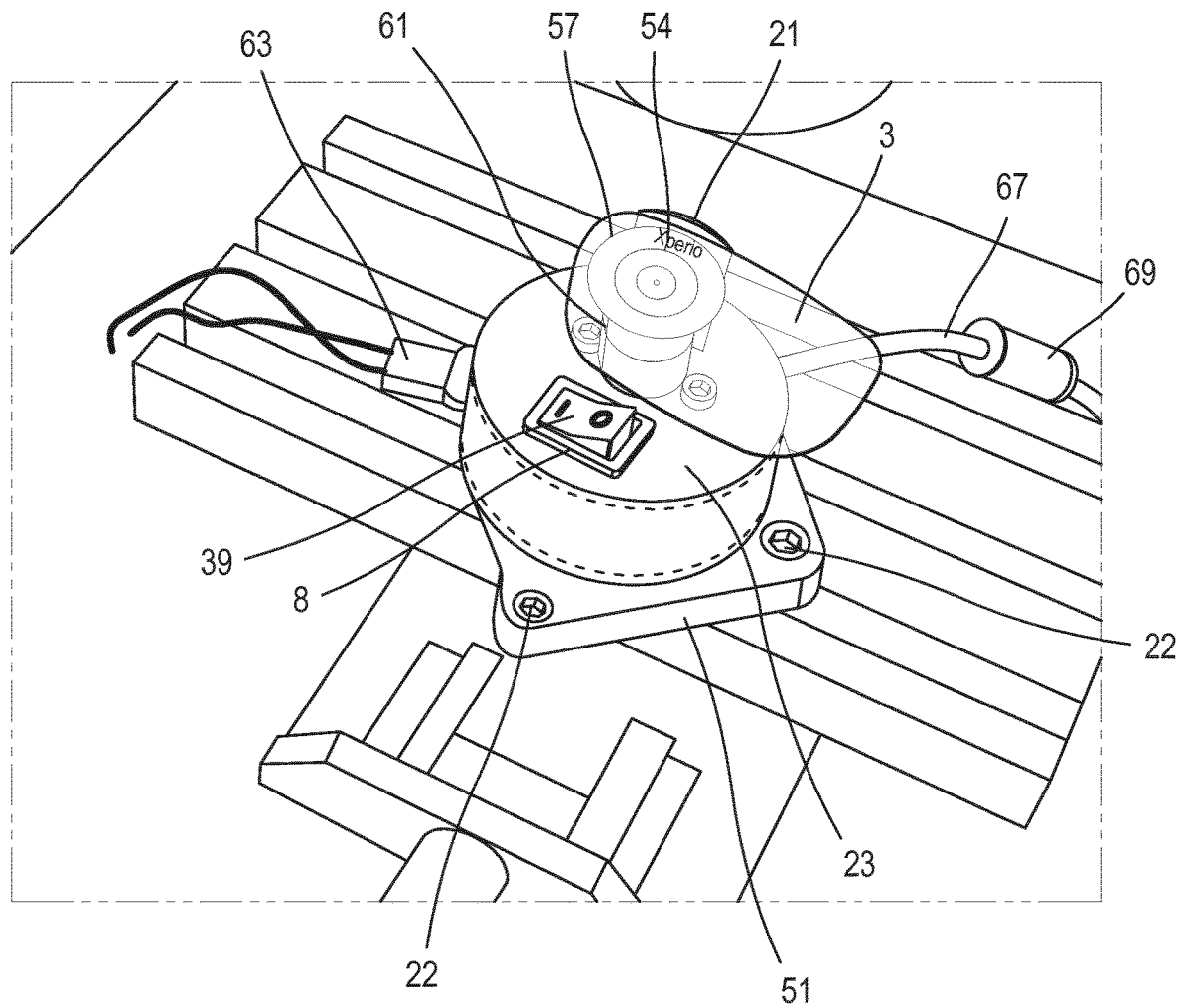
FIG. 11 illustrates a top view of the lens holder assembly with a lens positioned in relation to the lens holder assembly for a lens marking process.

Also described herein and illustrated in FIGS. 10 and 11 is a method of marking an ophthalmic lens that involves providing a lens holder assembly 49, as described herein, having a lens mounting sub-assembly 87 that comprises an illumination source positioned within channel 7 of the lens holder assembly 49, and a lens marking machine. The method further comprises illuminating at least a portion of the lens 3 using the illumination source. The illumination source emits light through channel 7 of the stem 61 to illuminate the ophthalmic lens 3. The lens 3 can comprise a convex and a concave surface. In one embodiment an optical marking 54 can be applied to a clear or transparent lens 3 using the process described herein. If a clear lens is used, the illumination source may not be needed, or the light color or intensity emitted from the illumination source may be adjusted, as desired. In another embodiment an optical marking 54 can be applied to a tinted lens 3 such as a sun-glass type or a polarizing lens using the process described herein. If a lens 3 is polarized or tinted, the illumination source can be activated such that at least a portion of the lens is illuminated, as described above.

The method further involves orienting at least a portion of the lens 3 on the lens mounting assembly 87 by rotating the lens, if necessary, in relationship to an optical marking 54 imprinted on a portion of the lens holder assembly, namely lens receiving means 57. When the lens is positioned on at least a portion of the lens mounting assembly 87, the lens 3 is positioned such that is in a contacting relationship with a back plate 21. The lens 3 can be positioned such that a convex surface of the lens 3 faces away from the lens holder assembly 49 and the concave surface of the lens faces toward first channel 5 of stem 61. At least a portion of the lens is positioned over the second opening 7 in which the illumination source is positioned. This allows the lens 3 to be illuminated by the illumination source from underneath the lens or toward the concave surface of the lens.

This method may further comprise adjusting or positioning the lens 3 by overlaying the lens on the optical marking such that an optical marking 54 will be applied to a surface of the lens 3 in a desired location on the lens by the lens marking machine 45. In an optional step, back plate 21 can be removed to orient and mark a progressive lens or a semi-finished lens with an optical marking 54. In another optional step, the lens marking machine 45 can be coupled to a visualization system, comprising at least a camera connected to a computer and a monitor, through which the lens 3 is positioned in relationship to the lens holder assembly 49 so that the any part of the optical marking process can be visually magnified.

The method of marking an ophthalmic lens 3 further comprises applying suction through channel 5 to at least a portion of the lens 3, for example, a lens surface, using compressed air from a compressed air source that is connected to air hose 67. The suction creates a vacuum seal to hold or fix the lens 3 in place by negative pressure applied to the lens during the marking process. Suction is applied through channel 5 by injecting compressed air from a suction source. The amount of compressed air that can be applied can be an amount that is sufficient to keep the lens 3 in a stationary position without external aid and to prevent it from moving. In one aspect, the amount of air that can be applied can be from about 3 psi to about 5 psi. To apply the compressed air a foot pedal (not shown) that is connected to the suction source can be manually actuated to start the injection of compressed air delivery through channel 5 to the lens. Although the compressed air is applied through channel 5, in other embodiments the compressed air can be applied through more than one opening. In one embodiment, suction can be applied to a lens 3 at multiple points on the surface of the lens 3 so that the suction is applied to any desired part of the lens 3. Suction can be applied to various portions of a lens 3. For example, suction can be applied to openings that are positioned sequentially or in a pre-determined pattern within the stem 61.

The method described herein further comprises applying an optical marking 54, such as an indicia or insignia, as described above to at least a portion of the lens 3. The marking can be applied to a convex surface of the lens 3. To apply a marking to the lens 3 during a marking procedure, a head of a lens marking machine comes into contact with lens 3 to apply indicia on the ophthalmic lens 3. After the lens 3 has been marked, the method further involves removing the compressed air suction from the lens 3. In another embodiment, this method can be used to mark clear or non-polarized lenses. If the method is used to mark clear or non-polarized lenses, then the illumination source is not necessary, but may be used, if desired.

The device and method described herein can be implemented in automated processes for mass production and manufacturing. The device and methods presented herein are beneficial because they allow a user to correctly and consistently position a lens 3 for the application of optical markings for individual lenses or for automated mass production. This device and method helps to reduce errors, process time, and costs. The device and method allows a user to put forth a minimal amount of force. The device and method described herein could be incorporated into a system that is adapted to be scaled up to operated at pre-determined rates and directions. This invention could be further adapted for automated carousels, rotating tables, or conveyor belt designs for manufacturing of ophthalmic lenses or even other types of products requiring markings, such as, for example, glass or plastic articles. Additional benefits of the device and method presented herein are that it is easy for an operator to use in a pad printing procedures during a manufacturing process.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A lens holder assembly for use with a lens marking apparatus comprising:

a stem having a central axis and a first opening extending along the central axis of the stem, the first opening being coupled to a suction source by a suction hose, a second opening integrated within the stem such that the second opening is substantially parallel to the first opening, a detachable positioning guide positioned to partially surround at least a portion of the stem, and at least one illumination source positioned within the second opening, wherein the illumination source is capable of emitting light through the second opening for illuminating at least a portion of an ophthalmic lens.

2. The assembly of claim 1, wherein the stem further comprises an annular recessed chamber surrounding the first opening.

3. The assembly of claim 2, wherein the assembly further comprises an annular lip member that is configured to be at least partially received by the recessed chamber.

4. The assembly of claim 1, wherein the illumination source is an LED light source.

5. The assembly of claim 1, wherein the assembly further comprises a top plate, and wherein the top plate further comprises a slot substantially surrounding at least a portion of the stem.

6. The assembly of claim 1, wherein the assembly is coupled to a base.

7. The assembly of claim 1, further comprising a lens receiving means, wherein the lens receiving means comprises a sealing lip and is operable to seal against a top surface of the stem, and wherein the lens receiving means comprises an opening for transmitting suction from the suction source to a surface of an ophthalmic lens to fix the lens relative to the lens holder assembly.

8. A method of marking an ophthalmic lens comprising:
providing a lens holder assembly, wherein the assembly comprises:

a stem having a central axis and a first opening extending along the central axis of the stem, a second opening integrated within the stem such that the second opening is substantially parallel to the first opening, a detachable positioning guide positioned to partially surround at least a portion of the stem, and at least one illumination source positioned within the second opening, wherein the illumination source is capable of emitting light through the second opening for illuminating at least a portion of an ophthalmic lens;

orienting at least a portion of the ophthalmic lens in relationship to at least a portion of the first opening;

applying suction to at least a portion of the lens through the first opening; and applying a marking to the lens.

9. The method of claim 8, wherein the method further comprises illuminating the lens using the illumination source after placing at least a portion of the lens over the first opening.

10. The method of claim 9, wherein the method further comprises positioning the lens over the first opening such that it is in a contacting relationship with the positioning guide that is positioned to partially surround at least a portion of the stem.

11. The method of claim 8, wherein the method further comprises removing the suction from the lens.

* * * * *